United States Patent [19]

Kobayashi et al.

[11] Patent Number: 4,639,628
[45] Date of Patent: Jan. 27, 1987

[54] SMALL SIZE MOTOR

[75] Inventors: Toshiji Kobayashi; Katsumi Matsumoto, both of Nagano, Japan

[73] Assignee: Kabushiki Kaisha Sankyo Seiki Seisakusho, Nagano, Japan

[21] Appl. No.: 632,170

[22] Filed: Jul. 19, 1984

[30] Foreign Application Priority Data

Nov. 8, 1983 [JP] Japan ............................ 58-171936[U]

[51] Int. Cl.$^4$ ............................................. H02K 11/00
[52] U.S. Cl. ............................. 310/194; 310/40 MM; 310/71
[58] Field of Search ................. 310/40 MM, 194, 162, 310/163, 164, 165, 49 R, 112, 42, 71, 156, 43, 89, 91, 216, 218, 254, 258; 336/185, 208

[56] References Cited

U.S. PATENT DOCUMENTS

| | | | |
|---|---|---|---|
| 2,982,872 | 5/1961 | Fredrickson | 310/156 |
| 3,549,918 | 12/1970 | Croymans | 310/49 R |
| 3,633,055 | 1/1972 | Maier | 310/162 |
| 3,711,732 | 1/1973 | Gerber | 310/162 |
| 3,906,264 | 9/1975 | Kuwako | 310/162 |
| 4,004,168 | 1/1977 | Haydon | 310/156 |
| 4,056,744 | 11/1977 | Blanchard | 310/156 |
| 4,074,157 | 2/1978 | Lace | 310/194 |
| 4,107,559 | 8/1978 | Patel | 310/194 |
| 4,174,485 | 11/1979 | Soden | 310/49 R |
| 4,255,681 | 3/1981 | Gerber | 310/40 MM |
| 4,355,248 | 10/1982 | Manson | 310/42 |
| 4,465,950 | 8/1984 | Guttinger | 310/162 |

Primary Examiner—R. Skudy
Attorney, Agent, or Firm—Sughrue, Mion, Zinn, Macpeak, and Seas

[57] ABSTRACT

A small sized motor comprises a core formed with numbers of bent pole-teeth at the periphery of the core and a single-flanged coil bobbin with its drum portion fitted onto the core at the outer periphery of said pole teeth to form a first bobbin assembly. The small sized motor further comprises second associated bobbin assembly. The pair of bobbin assemblies are coupled together in a back-to-back fashion. A pair of lead wire holding members are coupled to the outer periphery of the bobbin flange and are openable at hinge portions for winding a coil wire onto the bobbin.

1 Claim, 11 Drawing Figures

SMALL SIZE MOTOR

BACKGROUND OF THE INVENTION

The present invention relates to a small sized motor having an improved coil bobbin assembly which reduce the motor thickness.

Conventionally, the coil bobbin of a small motor is constituted by a drum portion and a pair of flanges formed integrally with the drum portion at the opposite sides thereof. If the thickness of the coil bobbin is reduced to make the motor thinner, the distance between the opposite flanges becomes narrowed to thereby decrease the space for accommodating a winding. To cope with this, it is necessary to make each of the flanges thinner. It is impossible or difficlut to mold such thin flanges integrally with the drum portion using an insulating synthetic resin material, because of the increased fluid flow resistance of the resin material in molding; constituting a drawback in the conventional technique.

SUMMARY OF THE INVENTION

An object of the invention is to provide a small motor in which a single-flanged coil bobbin is provided to make it possible to reduce the thickness of the motor, and further, in which the integration of the coil bobbin with a core is facilitated.

Another object of the present invention is to provide a small motor having a decreased outer diameter and a small thickness in which the projection of the lead wire holding portion from the outer periphery of the flange is decreased to reduce the outer diameter of the coil bobbin. The arrangement is made such that the pull-apart preventing portion of the lead wire holding portion does not provide interference even if the lead wire holding portions are bent outwardly in the winding operation.

A further object of the present invention is to provide a small motor having a decreased outer diameter and a small thickness, which device incorporates a lead wire base plate.

According to the present invention, there is provided a small size motor which said motor comprises a core formed with numbers of bent pole-teeth at its periphery and a single-flanged coil bobbin with its drum portion fitted onto the core at the outer periphery of the pole-teeth.

According to another aspect of the invention, there is provided a small motor comprising a core formed with numbers of bent pole-teeth at its periphery, and a coil bobbin having at least one flange portion and a drum portion, said drum portion being fitted onto said core at the outer periphery of said pole-teeth, in which a lead wire holding portion is projectingly held in parallel with said flange portion by a pair of hinge portions at the outer periphery of said flange portion, and said lead wire holding portion is formed integrally with said flange portion, said wire holding portion including a pull-apart preventing portion and a bridging holder member for holding a wire to be wound in cooperation with said flange portion, said hinge portions being formed at both sides of said lead wire holding portion, respectively, to provide two-point supports.

According to the invention, there is provided a small sized motor comprising a core formed with a number of bent pole-teeth at the periphery thereof and a coil bobbin having at least one flange portion and a drum portion, said drum portion being fitted onto said core at the outer periphery of said pole-teeth, in which a lead wire base plate to which the end portions of a coil wound on said bobbin are fixedly connected is provided on one of said core and said bobbin at the outer periphery of said core and is parallel to the axial direction of said motor.

BRIEF DESCRIPTION OF THE DRAWINGS

An embodiment of the present invention is shown in the drawings in which.

DETAILED DESCRIPTION OF THE PREFERRED EMBODIMENTS

Figure 1:
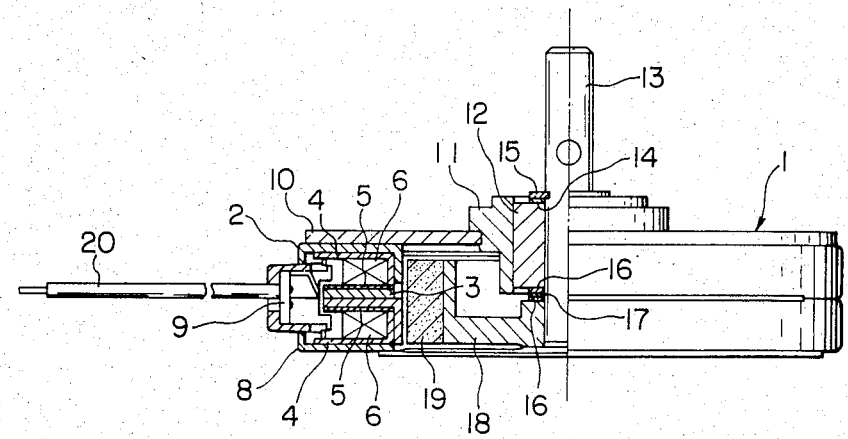
FIG. 1 is a partial cross-sectional side view of a small motor.

Referring now to the drawings, an embodiment of the present invention will be described in detail. In FIG. 1, in a small motor 1, a cup-like casing 2 formed with a number of bent pole-teeth is fixed to a base plate 10, the casing is combined with a metal core 3 formed with a number of bent pole-teeth to constitute and a stator yoke, a single-flanged coil bobbin 4 made of insulating synthetic resin material and an insulator plate 5 of synthetic resin which serves as another flange are provided in the assembly of the casing 2 and the core 3. An exciting coil 6 is wound on the coil bobbin 4. Another combination of another core 7 having the same shape as the core 3 and another casing 8 having the same shape as the casing 2 is fixed to the under surface of the core 3, and another insulator plate 5 having the same shape as the first-mentioned insulator plate 5 and another coil bobbin 4 having the same shape as the first-mentioned coil bobbin 4 are assembled with the core 7 and the casing 8, and another exciting coil 6 is wound on this coil bobbin 4. A bearing holder 11 is fixedly caulked at the center of the base plate 10 and a bearing 12 is fixedly attached to the bearing holder 11. A rotary shaft 13 is journaled by the bearing 12. A washer 14 and an E-ring 15 are fitted onto the rotary shaft at the upper side of the bearing 12, washers 16, 16 and a spring washer 17 are fitted onto the rotary shaft at the lower portion thereof, and a rotor holder 18 is fixedly provided at the lower end of the rotary shaft, a rotor magnet 19 being attached to the rotor holder 18 at the outer side thereof.

Figure 3:
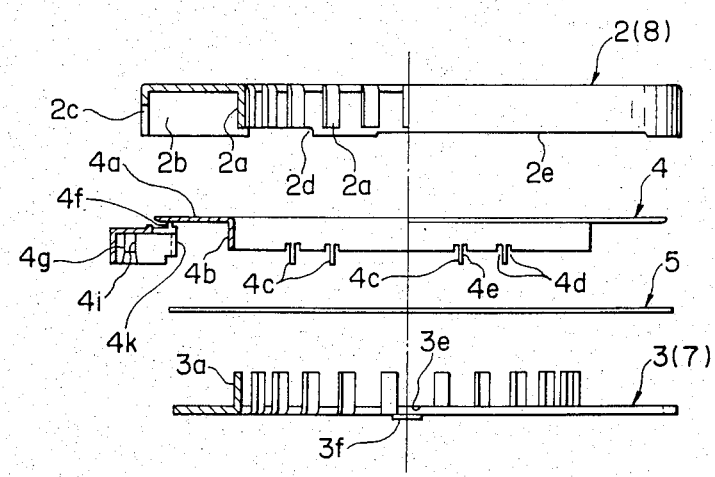
FIG. 3 is an exploded partial cross-sectional side view showing a set of a coil bobbin, an insulator plate and a core.
Figure 4:
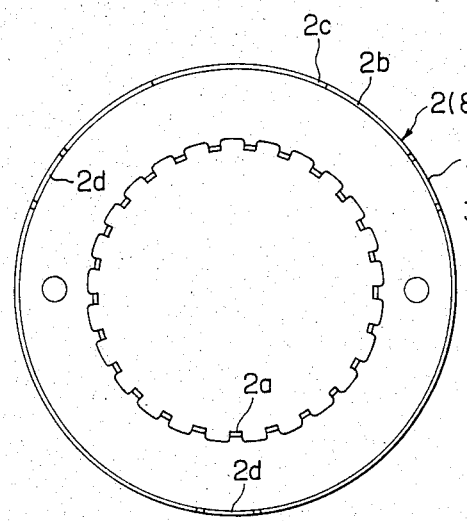
FIG. 4 is a plan view of the inside of a core.

As shown in FIGS. 3 and 4, the casing 2 and the casing 8 have the same shape. Casing 2 is formed with, at its cup-like bottom portion, numbers of pole-teeth 2a each directed downwardly in FIG. 3 (vertically upward relative to the paper plane in FIG. 4). A large and deep slot 2c and shallow slots 2d, 2d are formed in the circumference of each of the casings 2 and 8.

Figure 2:
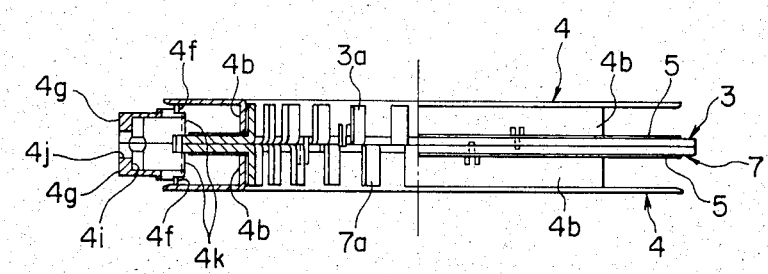
FIG. 2 is a partial cross-sectional side view of an assembly of two sets, each including a single-flanged coil bobbin, an insulator plate and a core.
Figure 5:
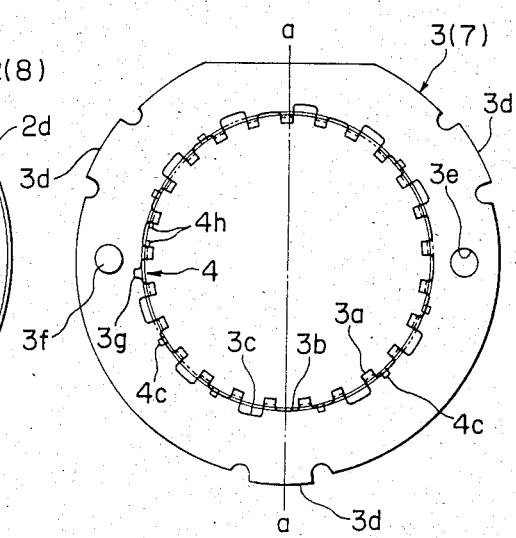
FIG. 5 is a plan view of the outside of a core.
Figure 6:
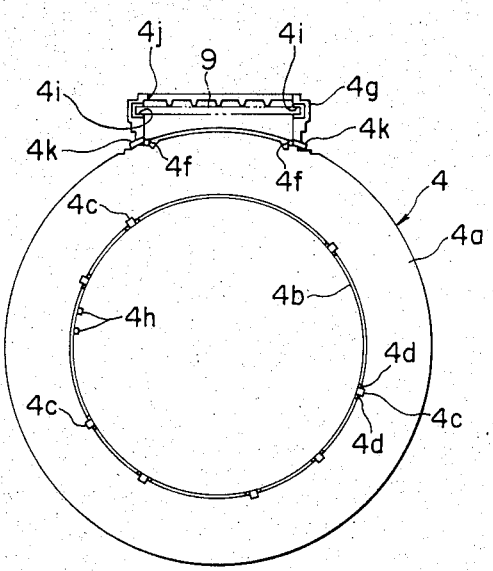
FIG. 6 is a plan view of the inside of a single-flanged coil bobbin.

As shown in FIGS. 2, 3 and 5, each of the core 3 and the core 7 having the same shape as the core 3 is formed with numbers of pole teeth 3a and 7a respectively pointing upwardly and downwardly in FIG. 2, upwardly in FIG. 3 and vertically downwardly relative to the paper plane in FIG. 5 (only the pole-teeth 3a are shown in FIGS. 3 and 5). Numbers of deep slots 3b and numbers of shallow slots 3c are formed between the numbers of pole-teeth 3a. Projecting portions 3d are formed at the circumference of the core 3, a through hole 3e and a projection 3f are formed at the outsides of a pair of pole-teeth 3a symmetrically opposed to each other with respect to the a-a line in FIG. 5, and a marking slot 3g is formed in the shallow slot 3b adjacent to the projection 3f for the purpose of positioning the insulator plate 5 in place.

Figure 7:
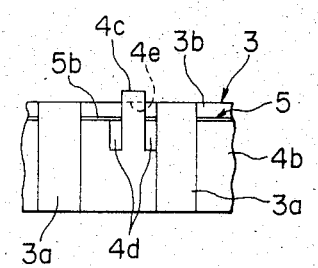
FIG. 7 is a side view showing the hooks and the core pole teeth.
Figure 8:
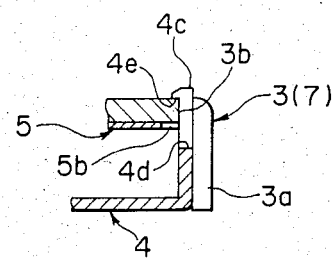
FIG. 8 is a cross-sectional side view of the arrangement shown in FIG. 7.
Figure 9:
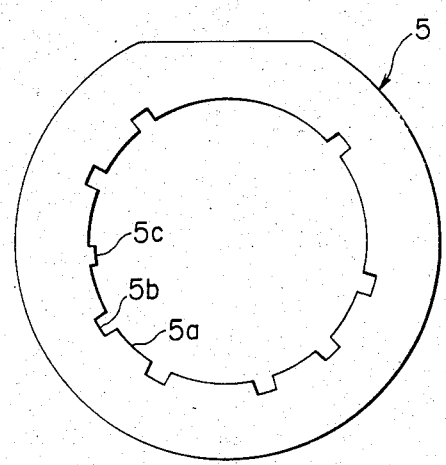
FIG. 9 is a plan view of the insulator plate.

As seen in FIGS. 2, 3, and 6 to 8, the single-flanged coil bobbin 4 is molded using an insulating synthetic resin material so as to be integrally provided with a thin annular flange 4a, a drum portion 4b, a plurality of hooks 4c projecting from the drum portion 4b, a pair of slots 4d formed at the right and left sides of each of the hooks 4c, a hook portion 4e formed at the tip of each of the hooks 4c and shown best in FIGS. 7 and 8, two-point-support hinge portion 4f, and lead wire holding portions 4g connected to each other through the hinge portion 4f. Further, positioning portions 4h to be used when the coil bobbin 4 is incorporated into the core 3 (7) are formed at the inside of the drum portion 4b. Fitting grooves 4i and 4i for a lead wire base plate 9, a slot 4j for leading out a lead wire 20, and pull-apart preventing portions 4k and 4k (FIG. 11) abutting against the inside of the cores 3, 7 as shown in FIG. 2 are also formed on the coil bobbin 4. As shown in FIGS. 3 and 9, the insulator plate 5 is annularly formed of a synthetic resin material to have a thickness thinner than the flange 4a, and is formed with slots 5b in the inner periphery thereof at the positions opposed to the respective hooks 4c of the coil bobbin 4, and an inwardly projecting positioning portion 5c.

When the coil bobbin 4, the core 3, and the insulator plate 5 are assembled, the annular inner periphery 5a of the insulator 5 is fitted to the outer periphery of the pole-teeth 3a of the core 3 as seen in FIG. 3 while inserting the positioning portion 5c into the gap between the two teeth 3a at which the positioning marking slot 3g is formed. The drum portion 4b of the coil bobbin 4 is fitted to the outer periphery of the pole-teeth 3a until the hooks 4c are inserted into the shallow slots 3b of the core 3 and the slots 5b of the insulator plate 5 as indicated by a phantom line in FIG. 5 and hooked to the outside of the core 3 so that the insulator plate 5 is sandwiched between the core 3 and the drum portion 4b as shown in FIGS. 7 and 8.

The other coil bobbin 4, the other insulator plate 5 and the core 7 are assembled in the same manner as above and the cores 3 and 7 are assembled back to back with the respective pole-teeth 3a and 7a directed axially outwardly while inserting the projections 3f and 7f into the through holes 7e and 3e respectively, thereby obtaining the state shown in FIG. 2.

In the case where the cores 3 and 7 are assembled with each other back to back, there occurs no inconvenience in coupling the cores 3 even if the hooks 4c are hooked at the shallow slots of the core 3 or 7, because a deep slot is formed at the symmetrically opposite position to a corresponding one of the shallow slots with respect to the a-a line in FIG. 5, so that a deep slot of the other core 7 or 3 is positioned oppositely to the shallow slot in question to which the hook 4c is hooked.

Figure 10:
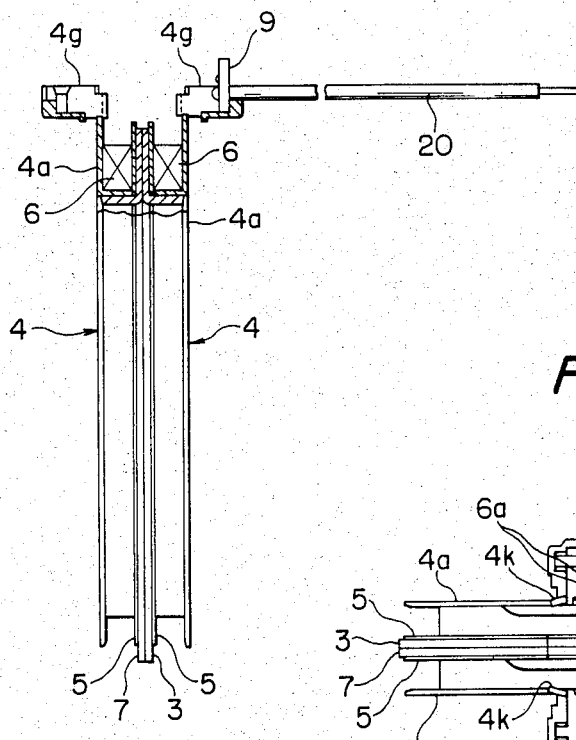
FIG. 10 is a cross-sectional side view showing the respective lead wire holding portions of the two coil bobbins opening right and left relative to the respective flanges.
Figure 11:
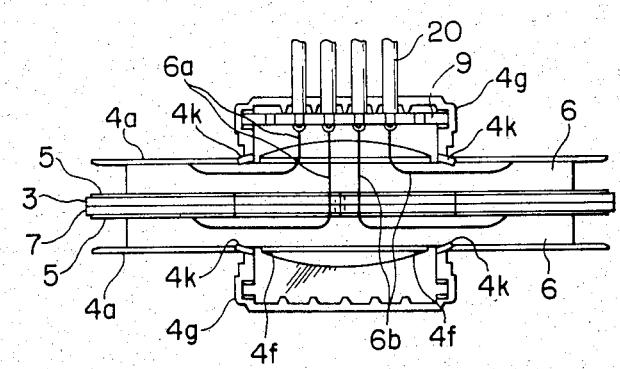
FIG. 11 is a diagram explaining the wiring of the excitation coil wound on the coil bobbin.

When the exiting coil 6 is to be wound on the coil bobbin 4 after the core, the insulator plate 5 and the coil bobbin 4 have been assembled, the lead wire holding portions 4g and 4g are opened, as shown in FIGS. 10 and 11 by pivoting about the hinge portions 4f by 90° with respect to the flanges 4a and 4a as shown in FIGS. 10 and 11 and the coil is wound beginning with the right side in FIG. 10, the starting and terminating ends 6a and 6b being soldered to the lead wire base plate 9. FIG. 11 illustrates the electrical connections made between starting and terminating ends and wires 20 via base plate 9, with holding portions 4g in the opened position.

The coil bobbins 4 on which the respective exciting coils 6 have been wound in the manner mentioned above are incorporated into the casings 2 and 8, respectively, to produce the small motor 1.

If the coil bobbin of the small motor is constructed in the manner described above, the drum portion 4b and the flange 4a of each of the single-flanged coil bobbins 4, and each of the insulator plates 5 may be made very thin to an extent which could not be considered in the conventional technique. The insulators 5 are placed in the respective cores 3 and 7 and the drum portions 4b of the respective coil bobbins 4 are inserted over the outer periphery of the pole-teeth until the hooks 4c are hooked over the outsides of the respective cores 3 and 7. The thin flange and the thin insulator plate ensure the shape of the thin coil bobbin in each of the cores 3 and 7 so as to make it possible to wind the excitation coil on each of the thin coil bobbins.

Further, since the single-flanged coil bobbins 4 and the respective cores 3 and 7 are assembled through hooking engagement by means of the hooks 4c, assembly can be easily performed. Further, since the flange 4a of the coil bobbin and the insulator plate 5 are made thin, the amount of winding of the excitation coil relative to the volume of the motor can be increased to thereby increase the rotational torque of the motor.

Although the small motor is constructed by assembling one set of a core 3, the single-flanged coil bobbin 4 and the insulator 5 back to back with another set of a core 7, the other single-flanged coil bobbin 4 and the other insulator 5, in the embodiment described above, it is a matter of course that the motor may be constituted by a single such set.

Although the respective insulator plates 5 are provided in the respective cores 3 and 7 by being sandwiched between the respective drum portions 4b and the cores 3 and 7 in the embodiment as described above, the insulator plate may be fixedly attached to each core by any other suitable means.

Further, alternatively, any other well known insulating method such that an insulating material is applied or evaporated onto each of the cores 3 and 7 that the coil per se is covered with an insulator to increase the dielectric strength, or the like, can be utilized in place of the insulator plate 5.

With the arrangement as described above, according to the present invention, the shape of the coil can be surely maintained even the coil bobbin is made thinner so that it can be made possible to provide a small sized thin motor. Further, the coil and the coil bobbin are assembled through a hooking engagement so that the necessity of incorporating a bobbin with a coil wound thereon into the core is eliminated. Accordingly, the assembly of the motor is made very easy. Thus, the small motor according to the present invention is very advantageous from a practical point of view.

What is claimed is:

1. A small motor, comprising, a core having a plurality of bent pole-teeth at a radial periphery thereof, a coil bobbin having at least one flange portion and a drum portion, said drum portion being fitted onto said core at the other periphery of said pole-teeth, lead wire holding means projecting from said flange portion and connected thereto by hinge portions at the outer periphery of said flange portion, said lead wire holding means connecting a wire wound on said coil bobbin to a lead wire, said hinge portions being formed at sides of said lead wire holding means so as to permit said lead wire holding means to pivot to a position generally axially displaced from a plane of said coil bobbin.

* * * * *